US010809671B2

United States Patent
Chi et al.

(10) Patent No.: US 10,809,671 B2
(45) Date of Patent: Oct. 20, 2020

(54) MOBILE TERMINAL AND CONTROL METHOD THEREOF

(71) Applicant: LG ELECTRONICS INC., Seoul (KR)

(72) Inventors: Jumin Chi, Seoul (KR); Minkyoung Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 144 days.

(21) Appl. No.: 15/579,858

(22) PCT Filed: Dec. 23, 2015

(86) PCT No.: PCT/KR2015/014174
§ 371 (c)(1),
(2) Date: Dec. 5, 2017

(87) PCT Pub. No.: WO2016/195193
PCT Pub. Date: Dec. 8, 2016

(65) Prior Publication Data
US 2018/0364648 A1    Dec. 20, 2018

(30) Foreign Application Priority Data
Jun. 5, 2015    (KR) .................. 10-2015-0079893

(51) Int. Cl.
*G04G 9/00*     (2006.01)
*G06F 1/16*     (2006.01)
(Continued)

(52) U.S. Cl.
CPC ........... *G04G 9/007* (2013.01); *G04G 9/0064* (2013.01); *G04G 21/04* (2013.01); *G04G 21/08* (2013.01);
(Continued)

(58) Field of Classification Search
CPC ....... G04G 9/0064; G04G 9/007; G04G 21/08
See application file for complete search history.

(56) References Cited

U.S. PATENT DOCUMENTS 9,575,591 B2 *   2/2017   Yang ..................... G06F 3/0481
9,930,157 B2 *   3/2018   Yang ................... H04M 1/6066
(Continued)

FOREIGN PATENT DOCUMENTS

| | | |
|---|---|---|
| JP | 2004072496 | 3/2004 |
| KR | 20100012665 | 2/2010 |

(Continued)

OTHER PUBLICATIONS

PCT International Application No. PCT/KR2015/014174, International Search Report dated Dec. 23, 2015, 4 pages.

*Primary Examiner* — Daniel P Wicklund
(74) *Attorney, Agent, or Firm* — Lee, Hong, Degerman, Kang & Waimey

(57) ABSTRACT

A mobile terminal and a method for controlling the mobile terminal are disclosed. The present invention includes a band wearable on a user's body, a display, and a controller configured to display, via the display, a clock area at a center of the display, cause to the display to move the clock area to an edge of the display corresponding to a first drag input when the first drag input is received on the clock area, and display, via the display, an notification icon at the center. According to an embodiment of the present invention, notification contents may be dynamically displayed according to user's interaction.

20 Claims, 24 Drawing Sheets

(51) Int. Cl.
*G06F 3/0484* (2013.01)
*G06F 3/0486* (2013.01)
*G04G 21/04* (2013.01)
*G04G 21/08* (2010.01)
*G06F 3/0481* (2013.01)

(52) U.S. Cl.
CPC ............ *G06F 1/163* (2013.01); *G06F 3/0486* (2013.01); *G06F 3/04842* (2013.01); *G06F 3/04845* (2013.01); *G06F 3/04847* (2013.01); *G06F 3/04817* (2013.01)

(56) References Cited

U.S. PATENT DOCUMENTS

| | | | | |
|---|---|---|---|---|
| 2010/0029327 | A1* | 2/2010 | Jee | G04G 17/045 455/556.1 |
| 2014/0139422 | A1* | 5/2014 | Mistry | G06F 3/014 345/156 |
| 2015/0049033 | A1* | 2/2015 | Kim | G06F 3/041 345/173 |
| 2015/0135086 | A1* | 5/2015 | Lee | G06F 3/0488 715/739 |
| 2015/0286391 | A1* | 10/2015 | Jacobs | G06F 1/163 715/771 |
| 2015/0358043 | A1* | 12/2015 | Jeong | H04B 1/385 455/411 |
| 2015/0378592 | A1* | 12/2015 | Kim | G06F 1/1626 715/765 |
| 2016/0334888 | A1* | 11/2016 | Park | G06F 3/0362 |
| 2016/0342327 | A1* | 11/2016 | Chi | H04M 1/05 |
| 2017/0031556 | A1* | 2/2017 | Yang | G06F 3/0488 |
| 2017/0115860 | A1* | 4/2017 | Youn | G06F 3/0482 |
| 2018/0059894 | A1* | 3/2018 | Kim | G06F 3/04817 |

FOREIGN PATENT DOCUMENTS

| | | |
|---|---|---|
| KR | 20140064687 | 5/2014 |
| KR | 101480675 | 1/2015 |
| KR | 20150019875 | 2/2015 |

\* cited by examiner

【Figure 1】
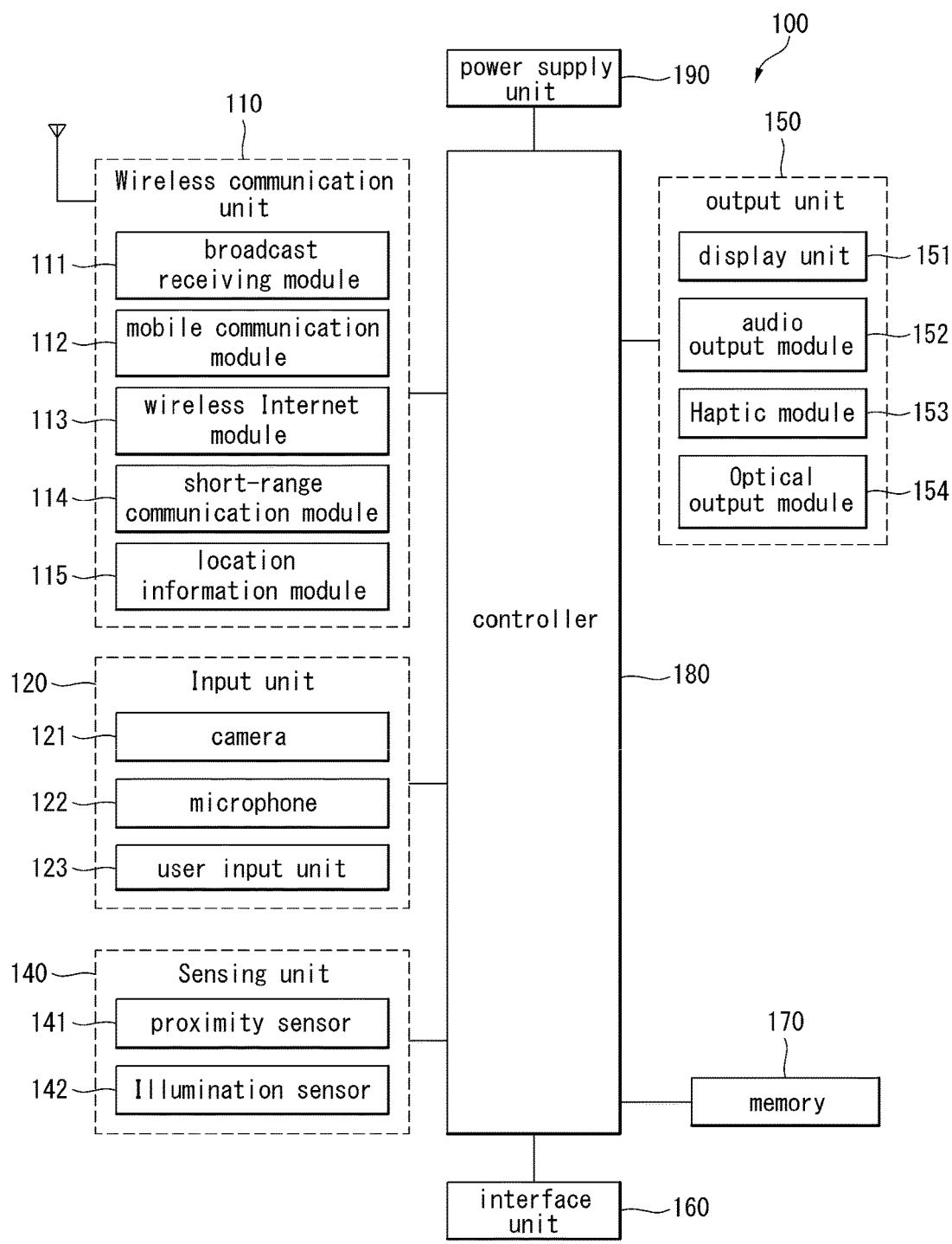

【Figure 2a】
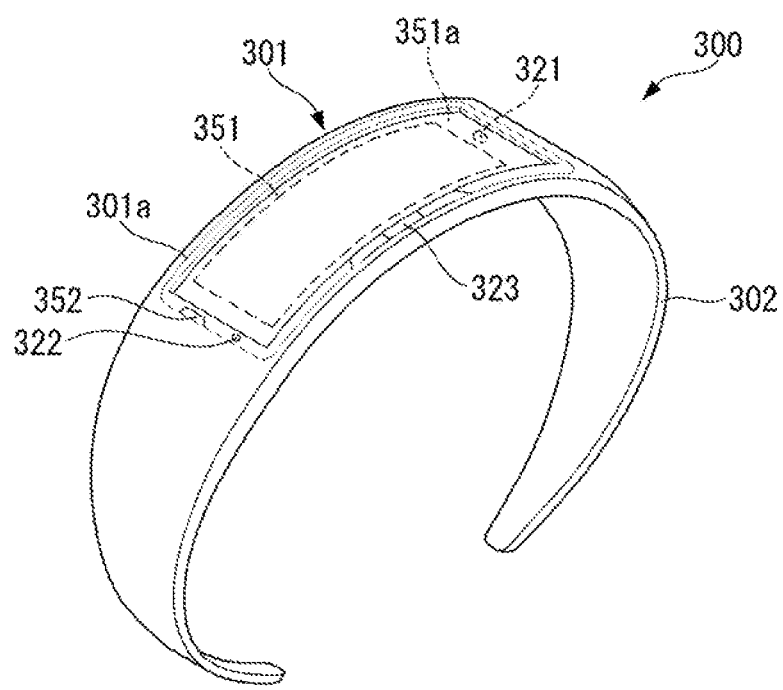

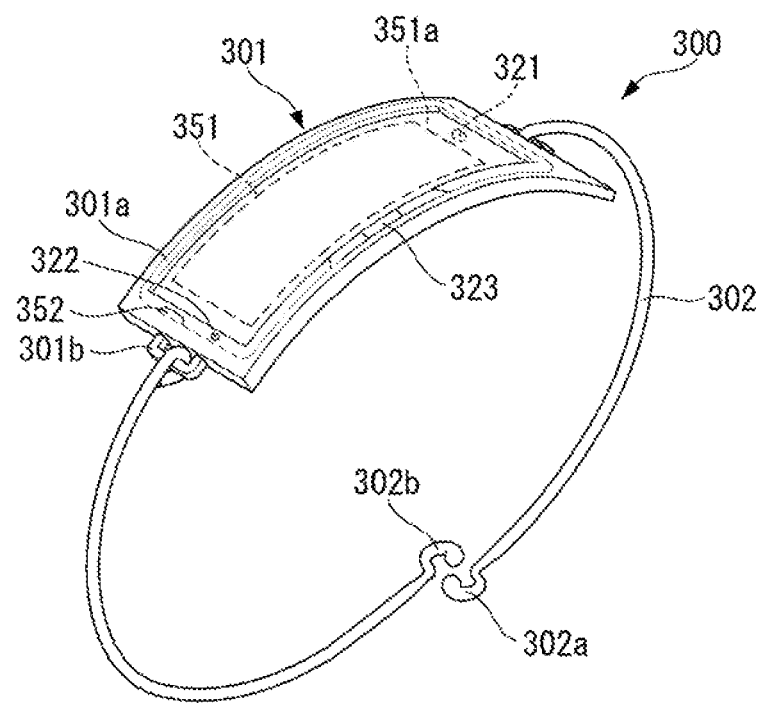
【Figure 2b】

[Figure 3]
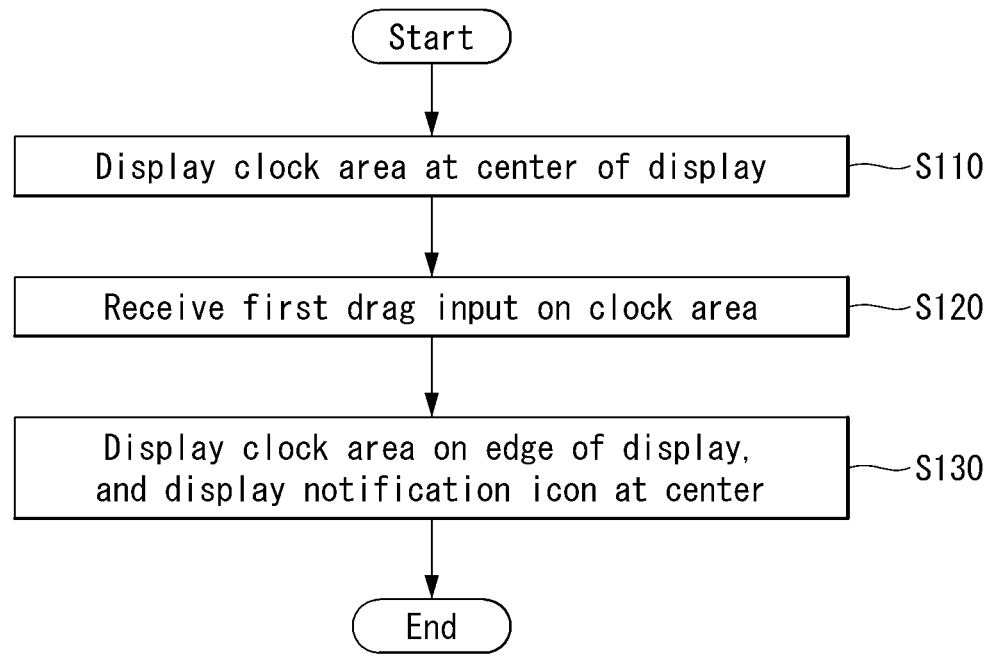

【Figure 4】
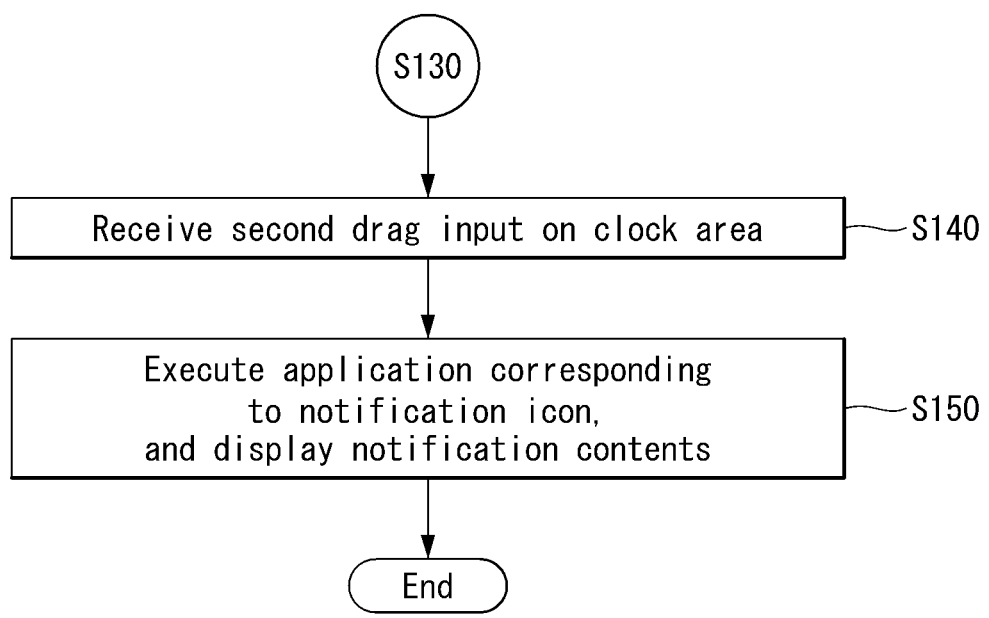

[Figure 5]
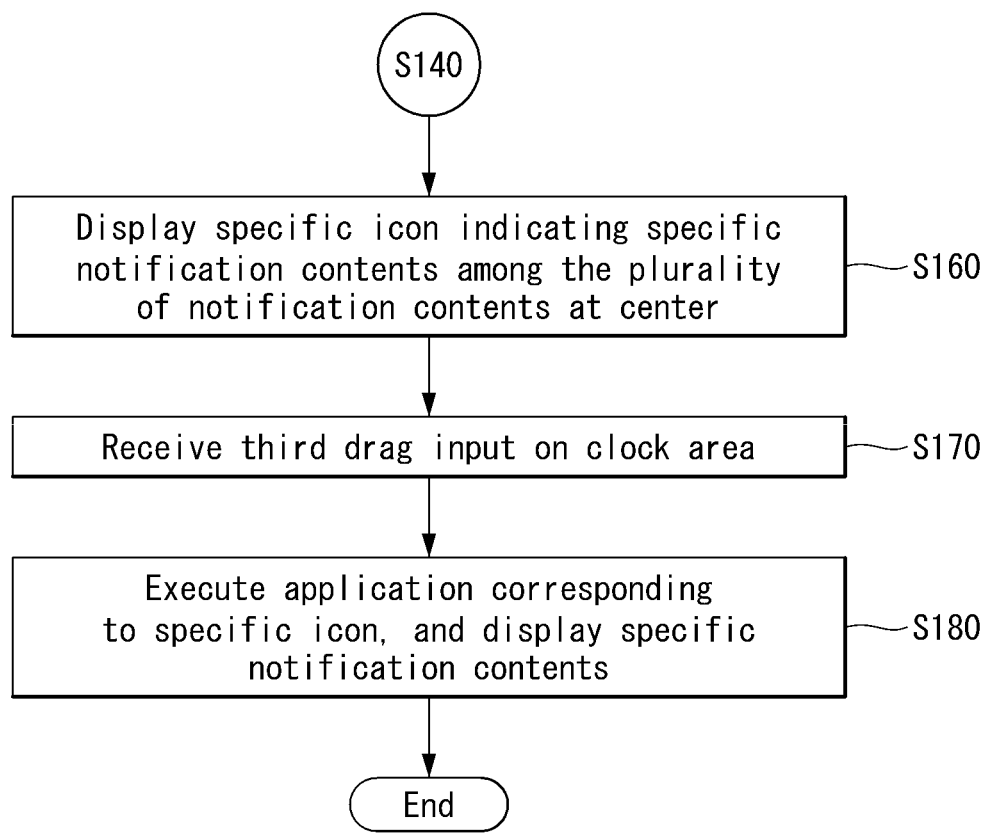

【Figure 6】
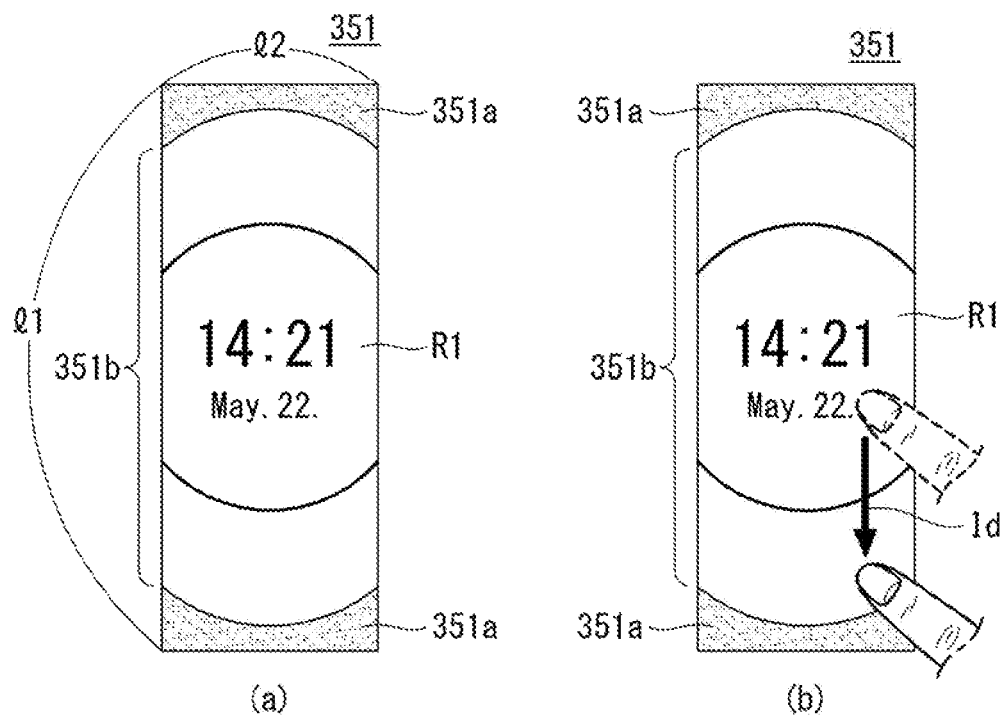
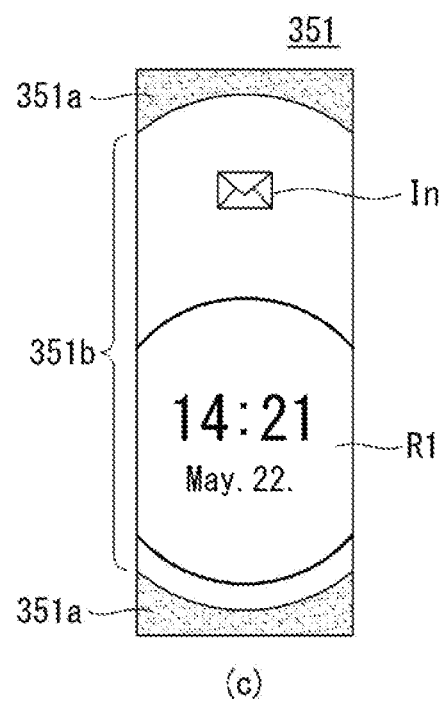

【Figure 7】
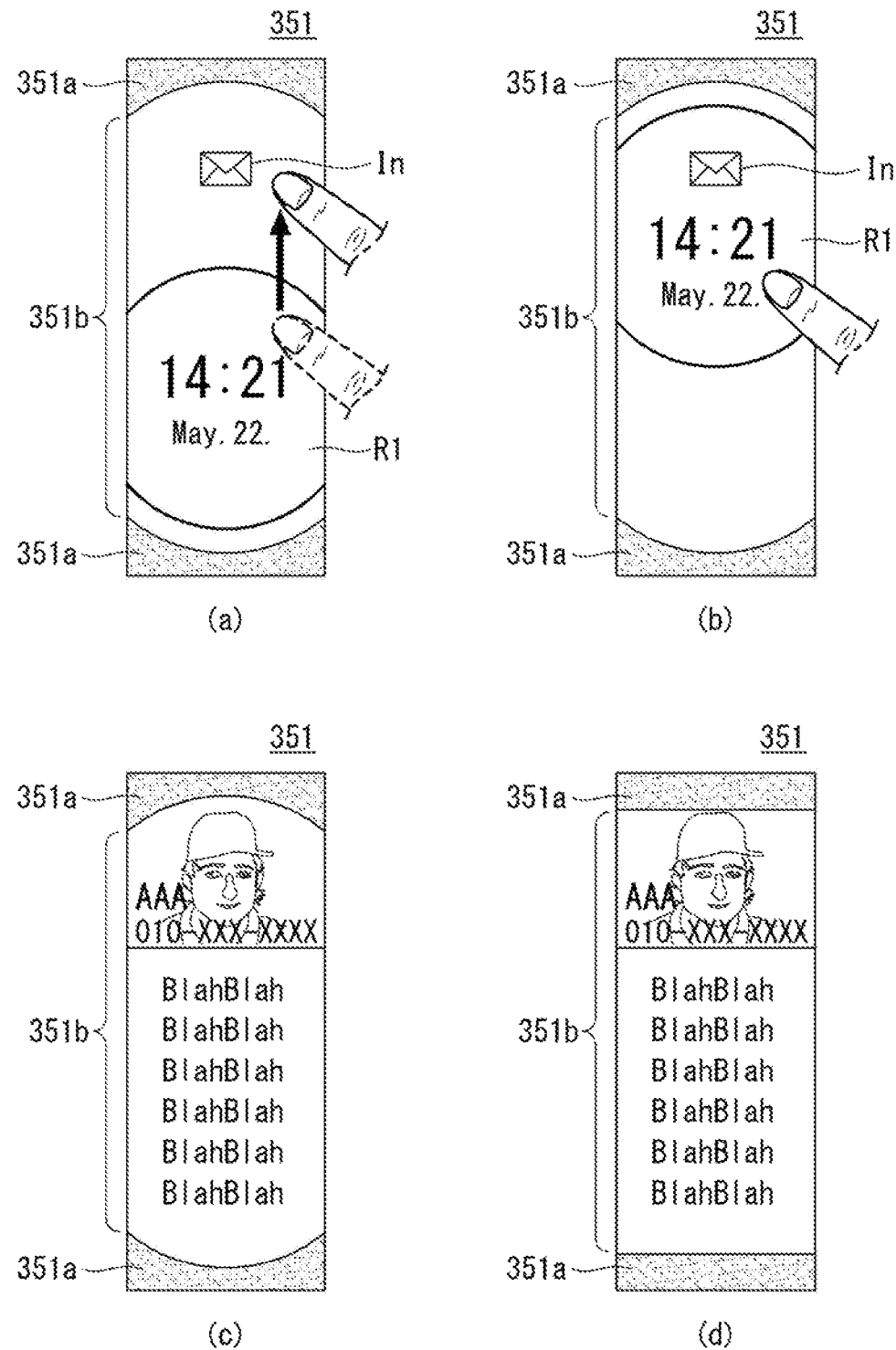

【Figure 8】
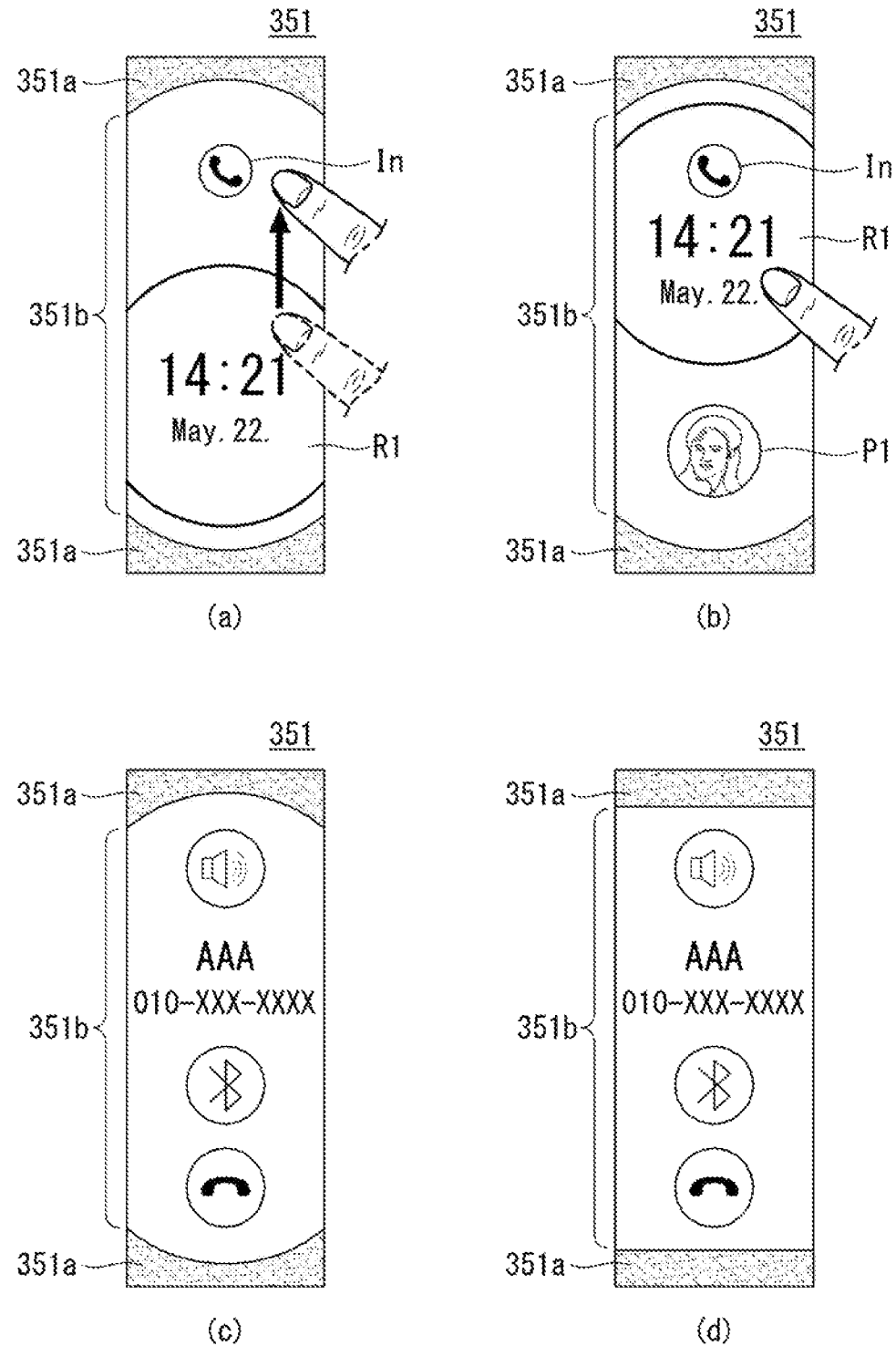

[Figure 9]
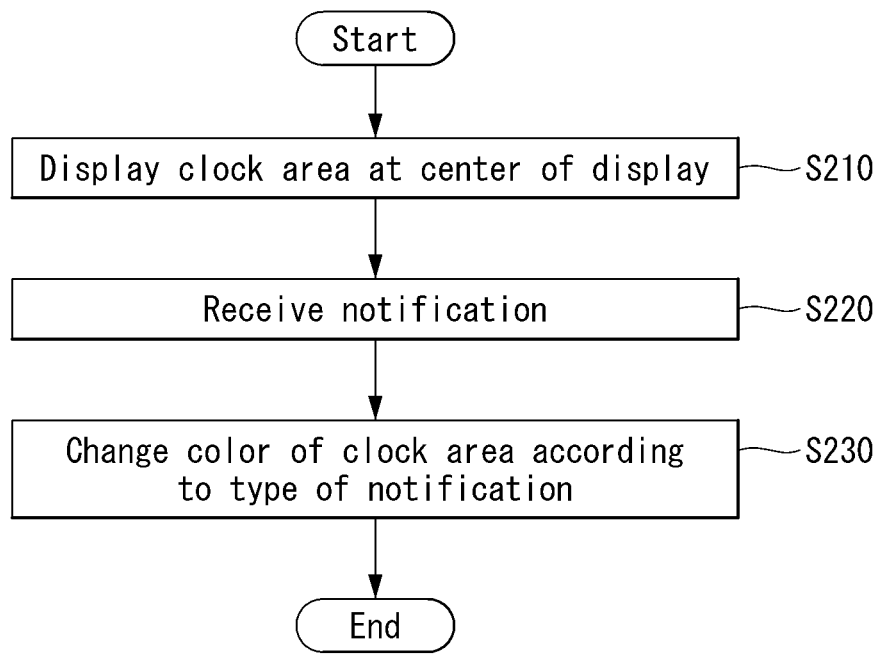

【Figure 10】
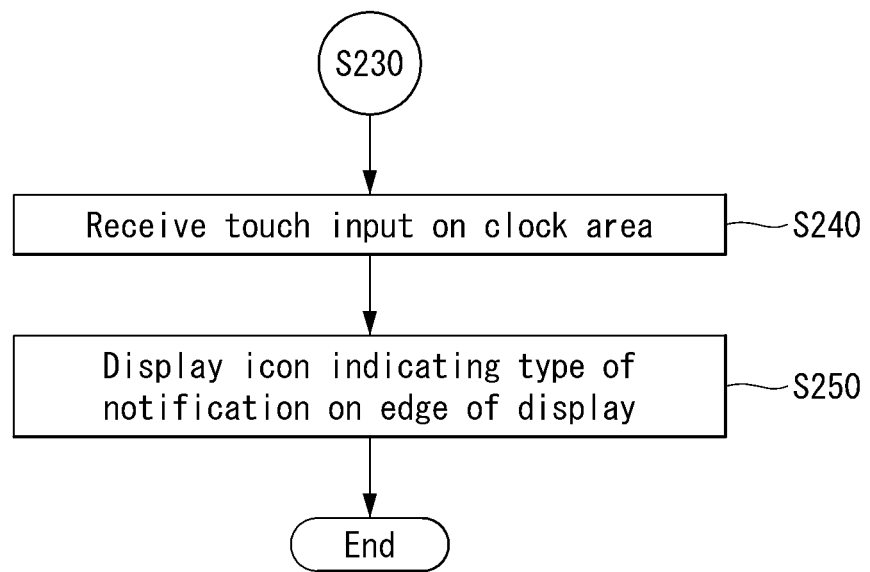

[Figure 11]
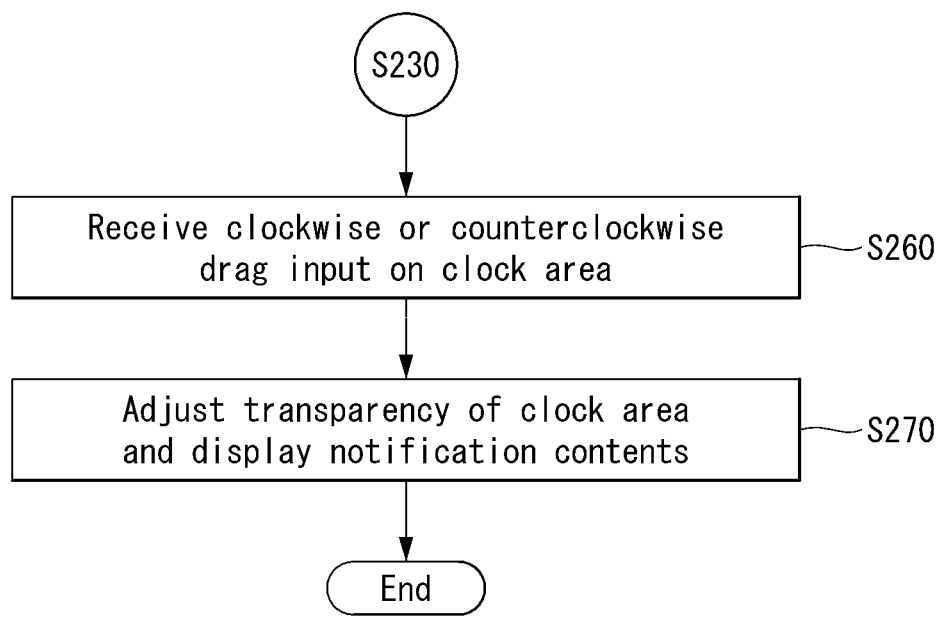

[Figure 12]
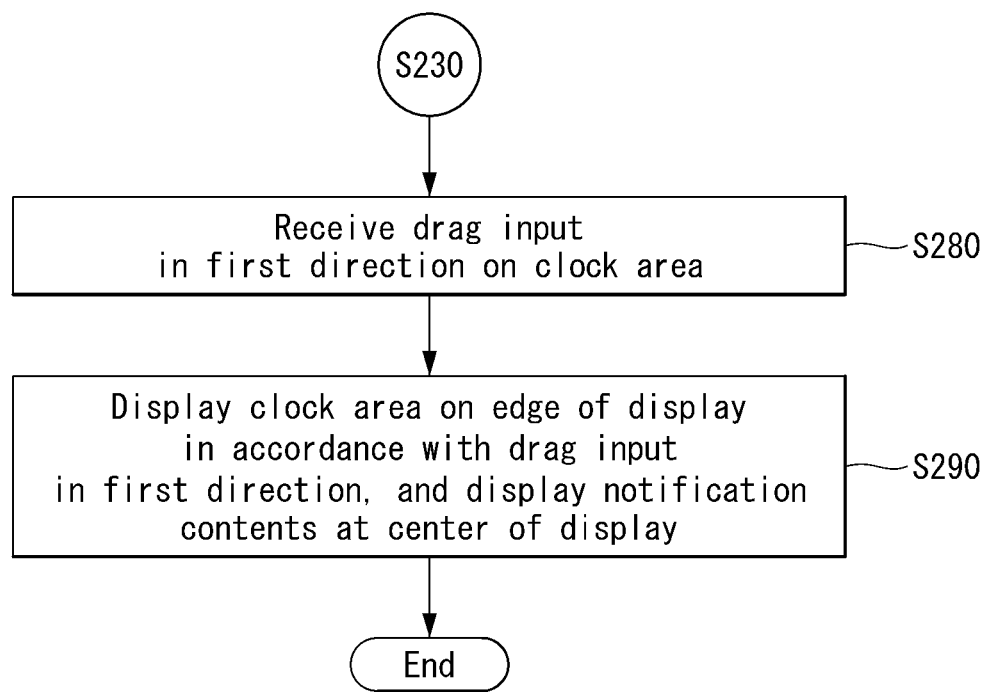

【Figure 13】
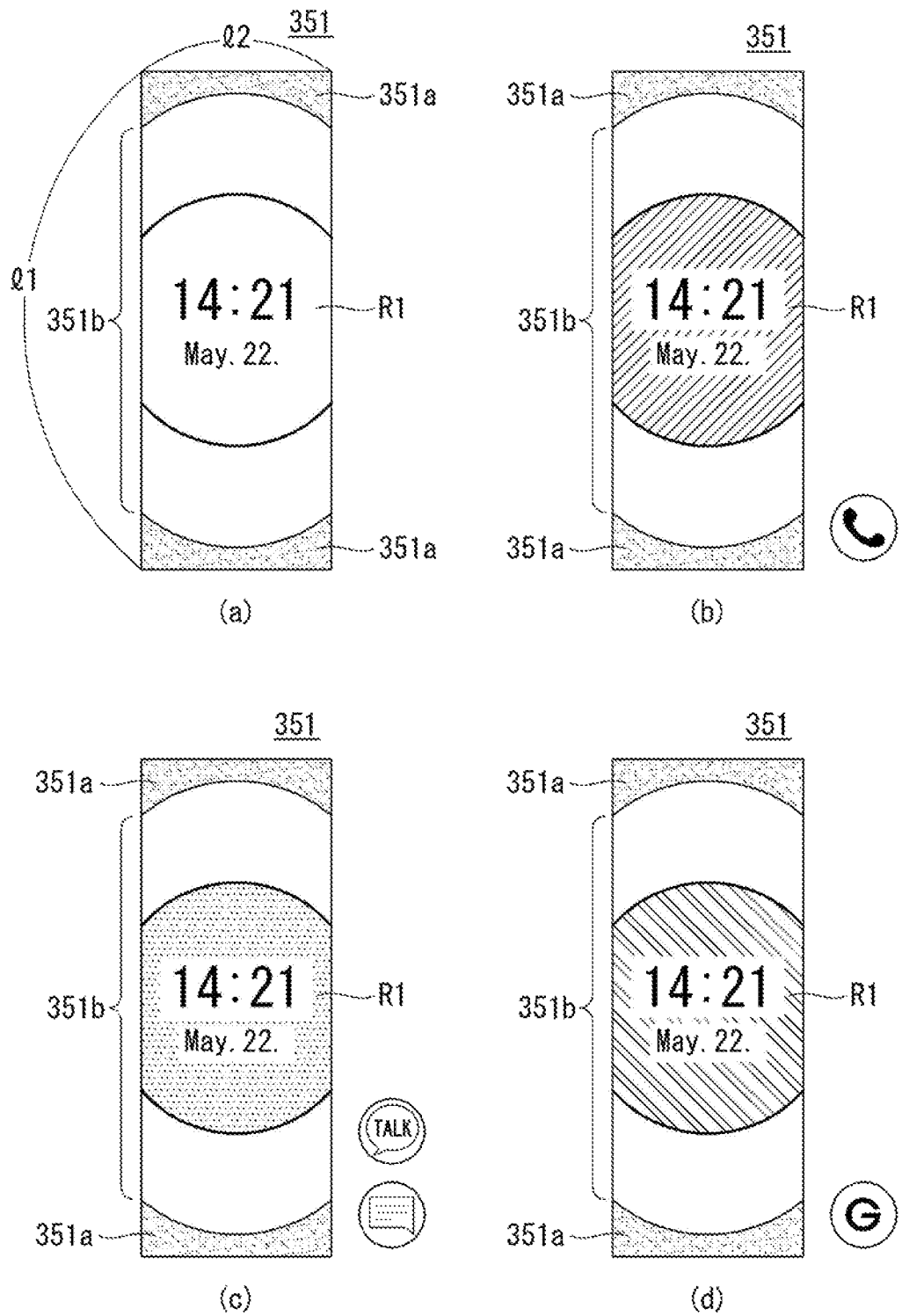

【Figure 14】
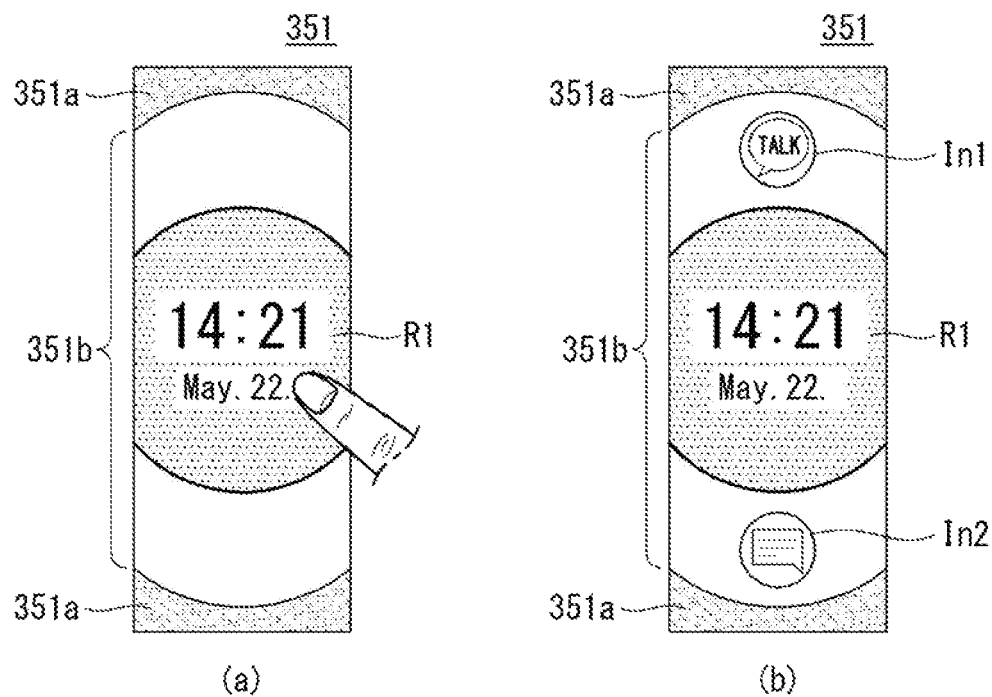

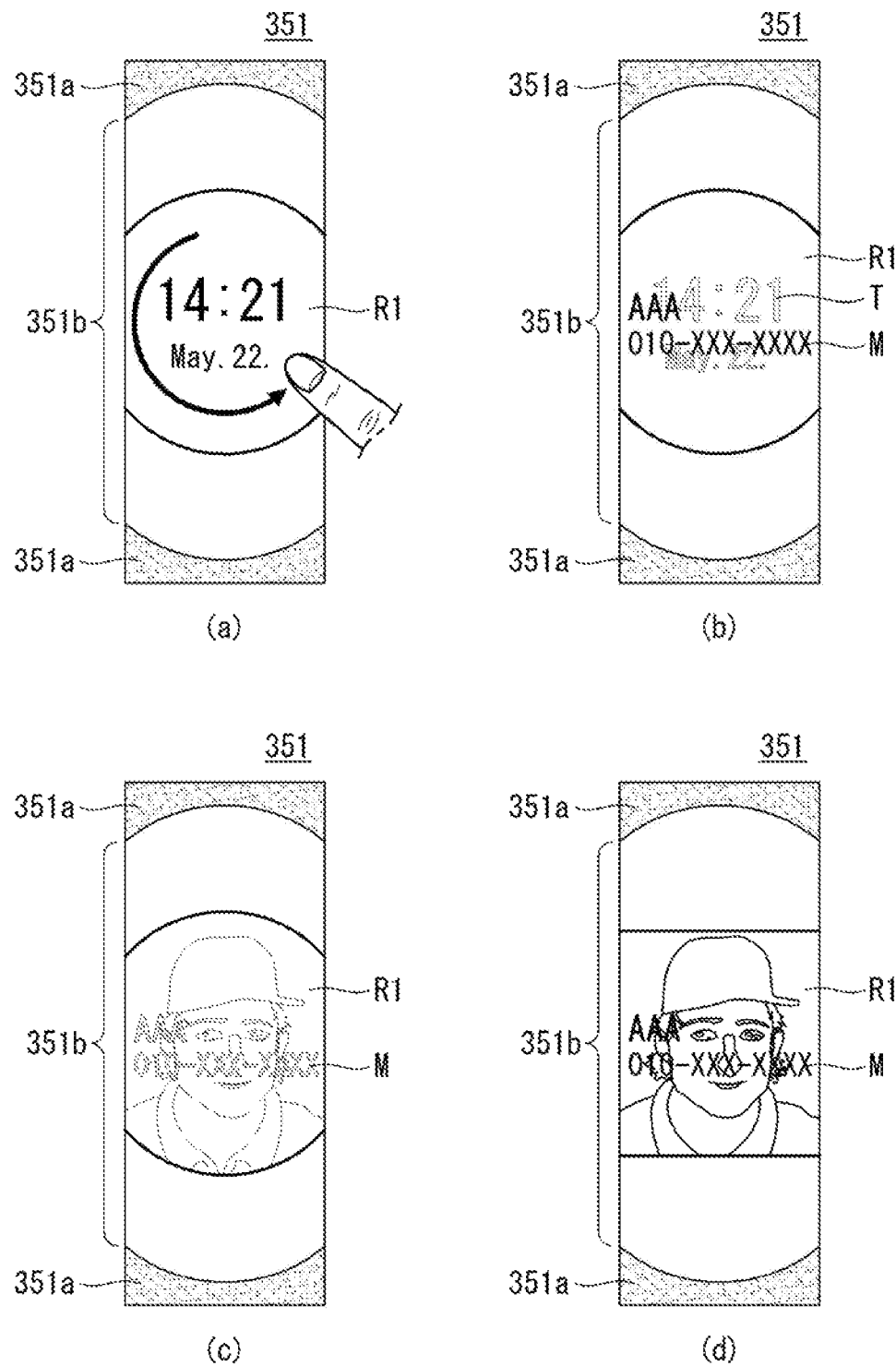
[Figure 15]

【Figure 16】
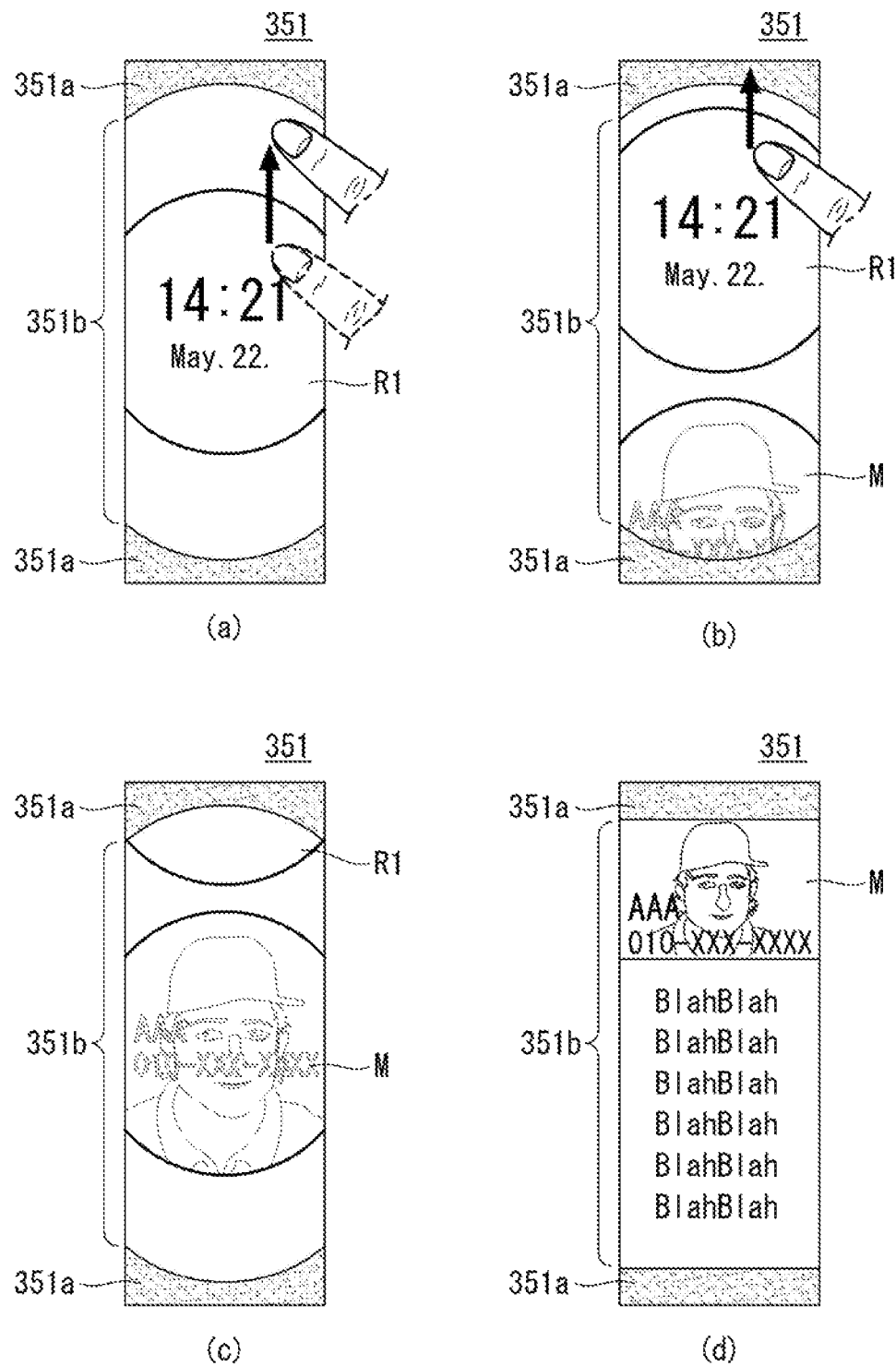

[Figure 17]
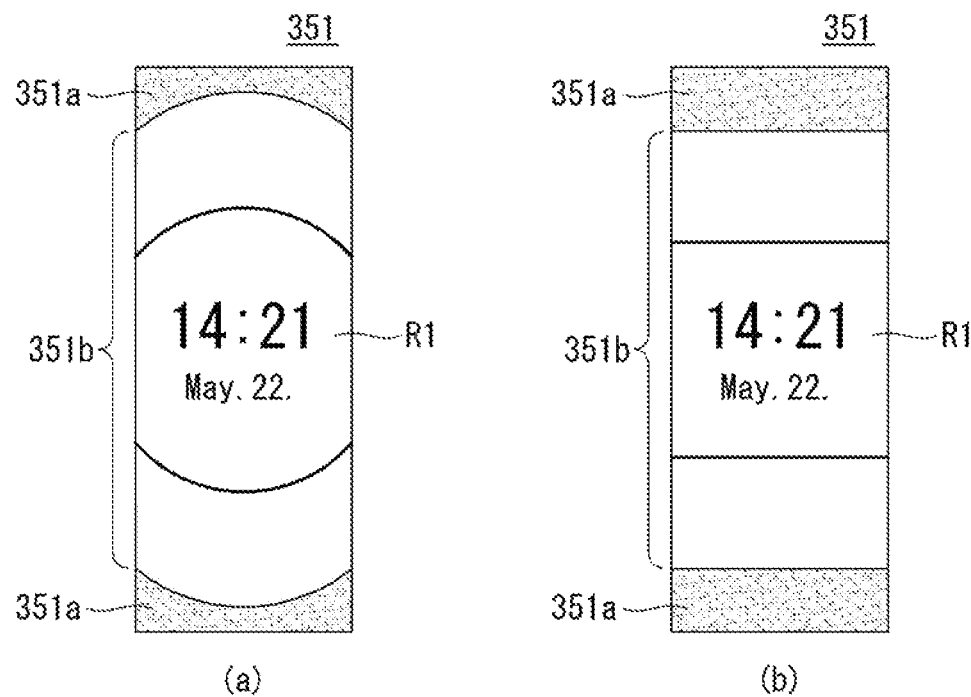

【Figure 18】
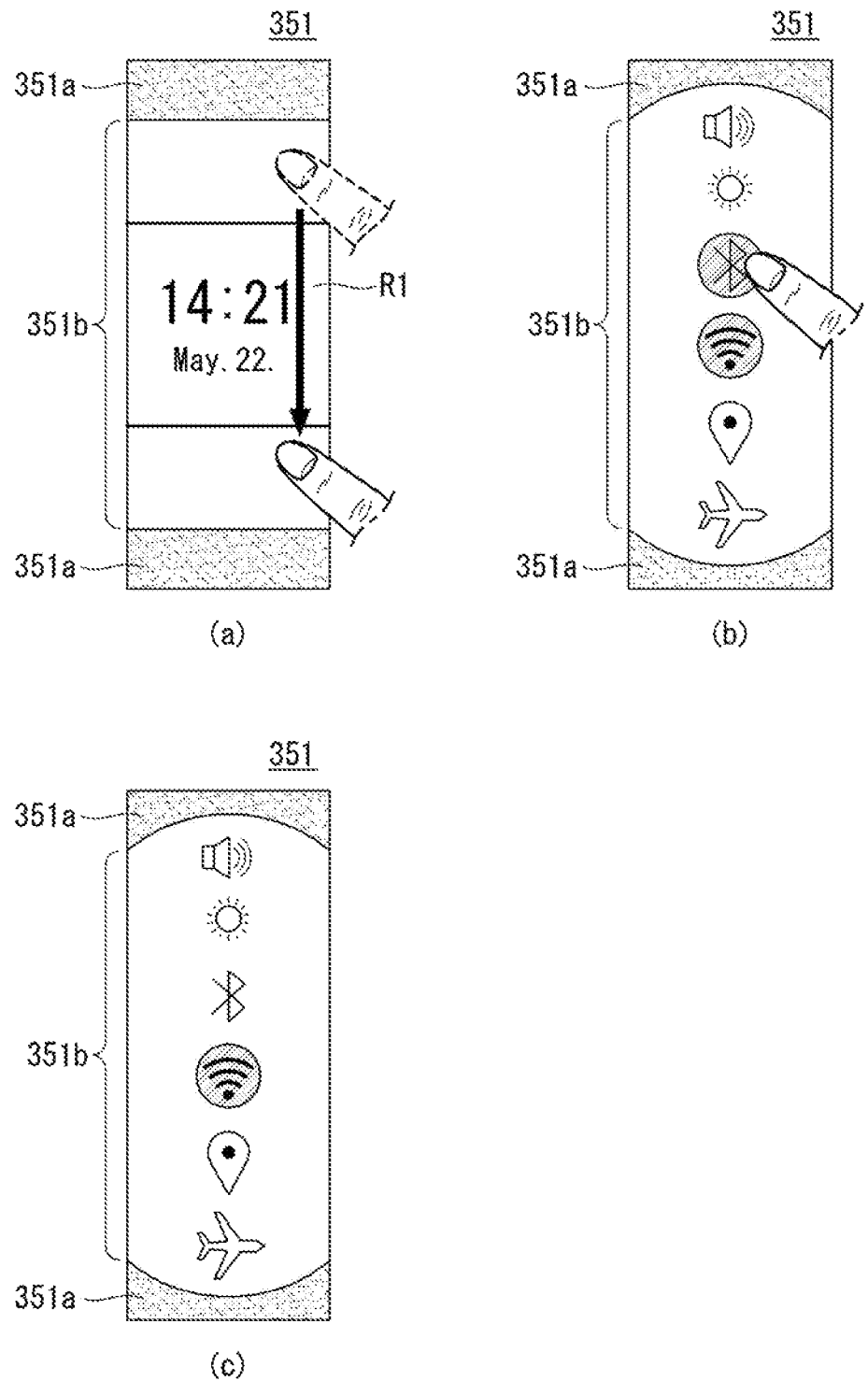

[Figure 19]
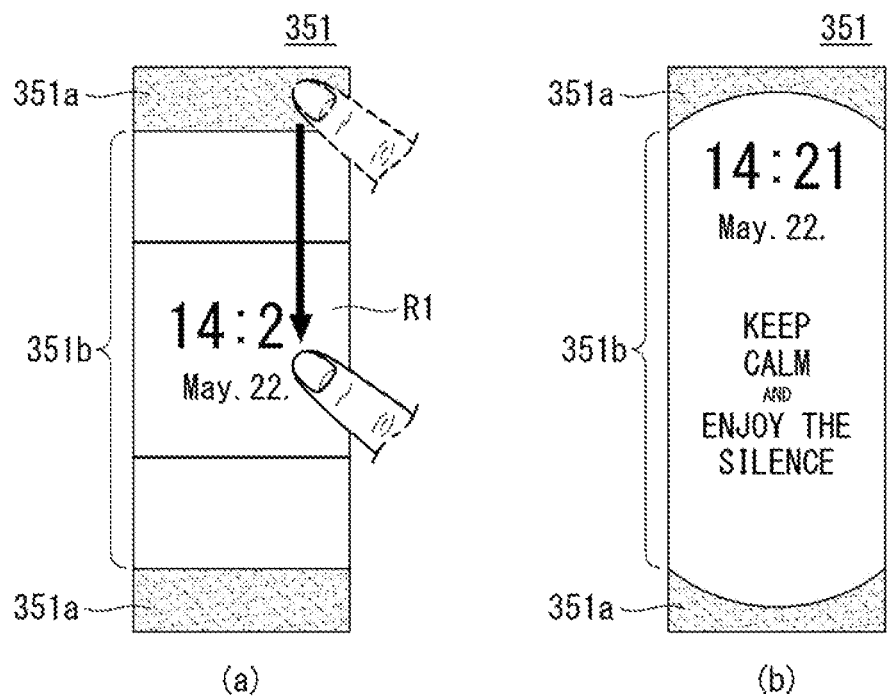

[Figure 20]
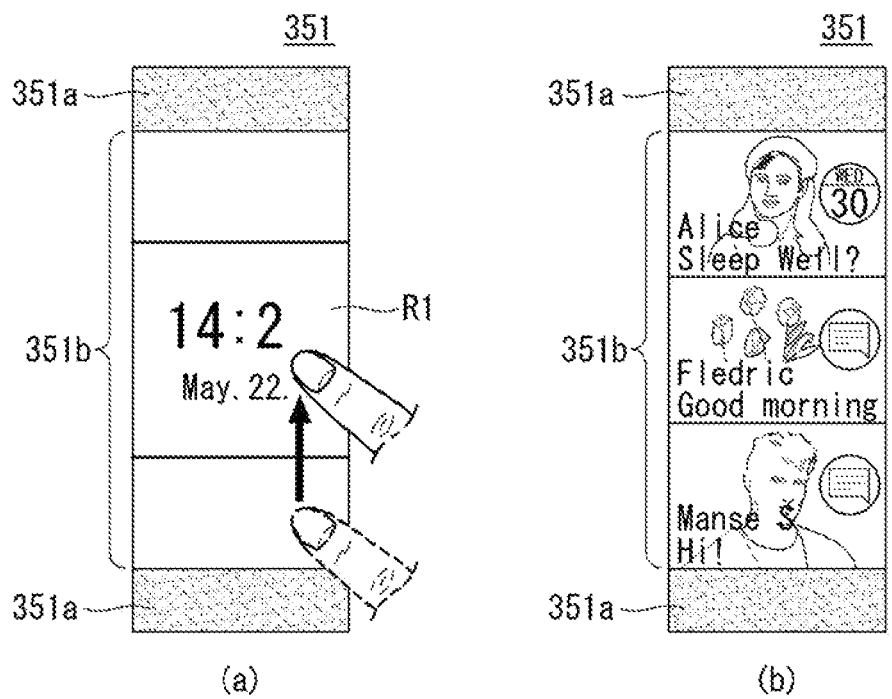

【Figure 21】
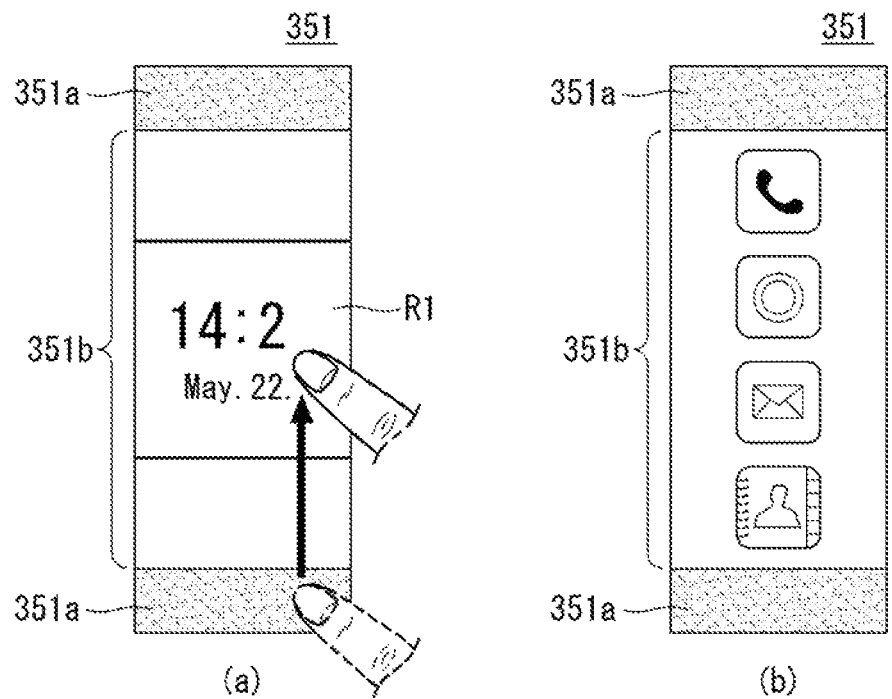

【Figure 22】
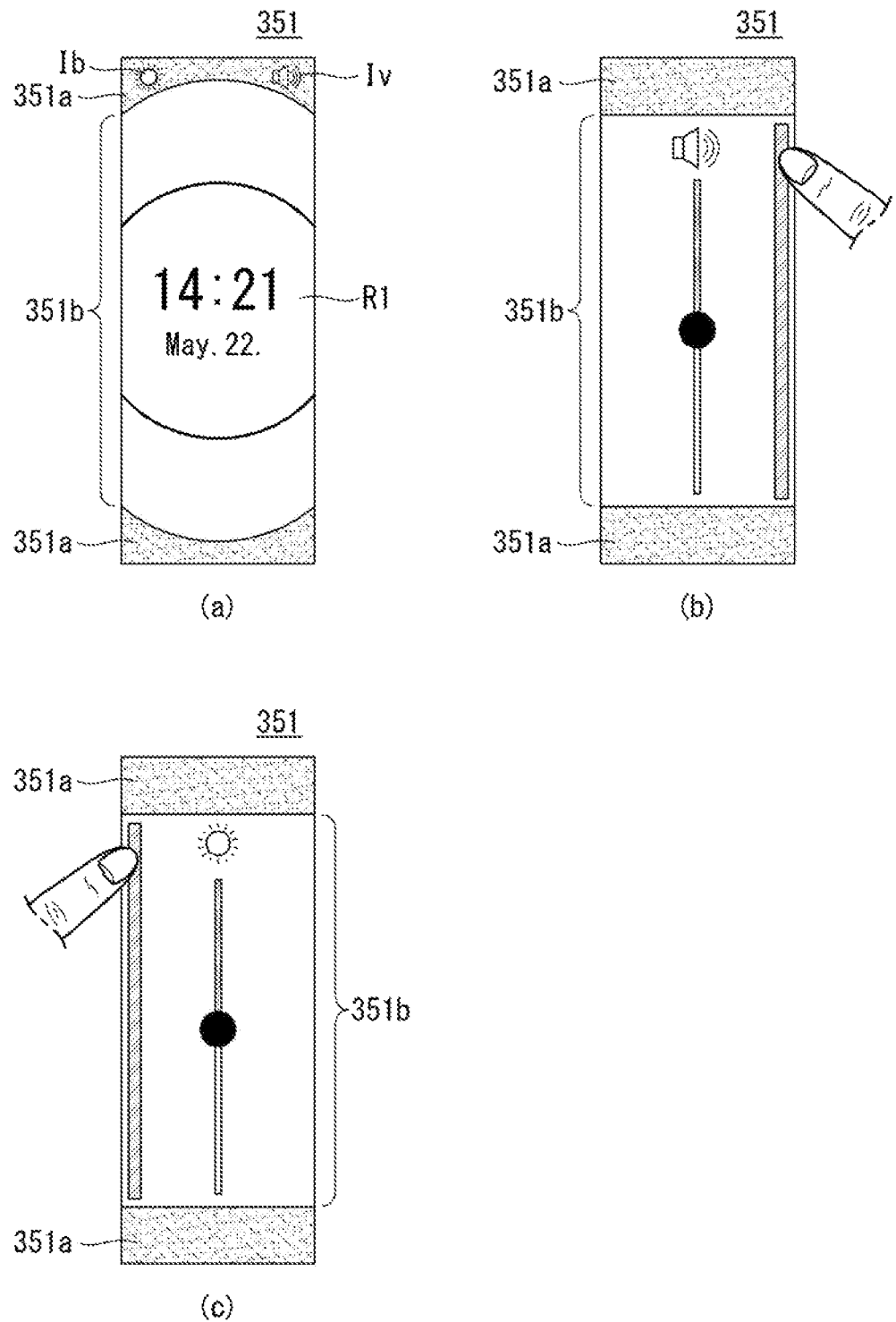

[Figure 23]
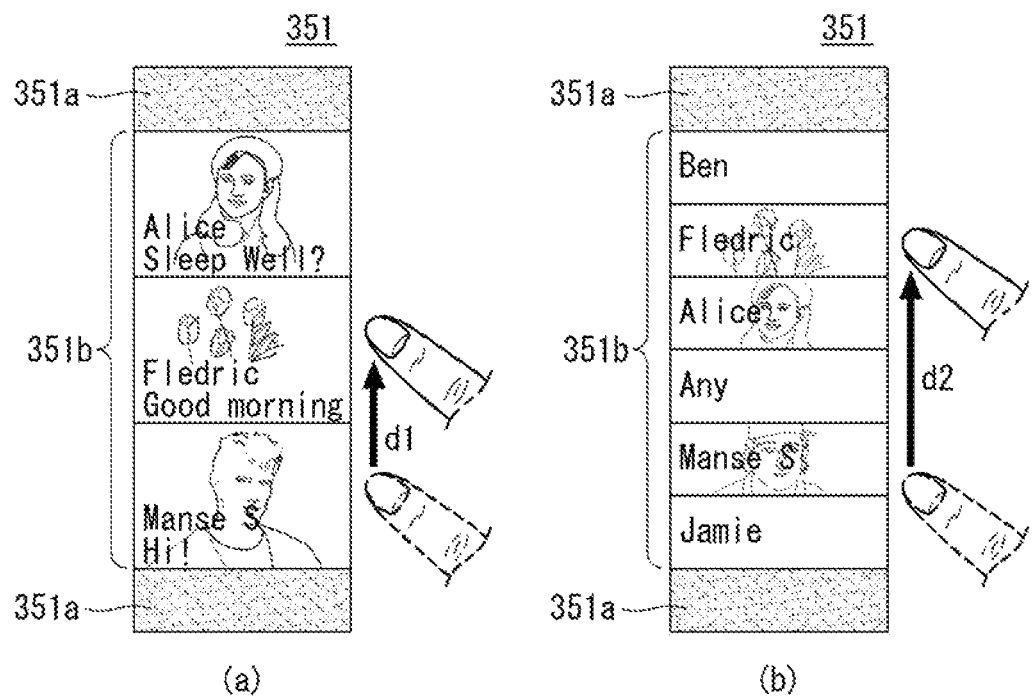

MOBILE TERMINAL AND CONTROL METHOD THEREOF

CROSS-REFERENCE TO RELATED APPLICATIONS

This application is the National Stage filing under 35 U.S.C. § 371 of International Application No. PCT/KR2015/014174, filed on Dec. 23, 2015, which claims the benefit of earlier filing date and right to priority to Korean Application No. 10-2015-0079893, filed on Jun. 5, 2015, the contents of which are all hereby incorporated by reference herein in their entireties.

TECHNICAL FIELD

The present invention relates to a mobile terminal for displaying a notification by moving a clock area and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user may directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of the terminal are diversified, the terminal is implemented as a multimedia player provided with composite functions such as photography of still or moving pictures, playback of music or moving picture files, game play, broadcast reception and the like, for example.

To support and increase the terminal functions, the improvement of structural parts and/or software parts of the terminal may be considered.

DISCLOSURE

Technical Problem

An object of the present invention is to solve the aforementioned problem and other problems. Another object of the present invention is to provide a mobile terminal and a method for controlling the same displaying a clock area at a center of the display is formed on one side, a length of the first direction of the display being longer than a length of the second direction of the display, and moving the clock area to an edge of the display corresponding to a first drag input when the first drag input is received on the clock area, and displaying an notification icon at the center.

Another object of the present invention is to provide a mobile terminal and a method for controlling the same displaying a clock area at a center of the display is formed on one side, a length of the first direction of the display being longer than a length of the second direction of the display, and changing a color of the clock area according to a type of a notification when the notification is received.

Technical Solution

According to an aspect of the present invention to accomplish the above objects or other objects, there is provided a mobile terminal including: a band wearable on a user's body; a display; and a controller configured to display, via the display, a clock area at a center of the display, cause to the display to move the clock area to an edge of the display corresponding to a first drag input when the first drag input is received on the clock area, and display, via the display, an notification icon at the center.

According to another aspect of the present invention, there is provided a mobile terminal including: a band wearable on a user's body; a wireless communication unit; a display; and a controller configured to display, via the display, a clock area at a center of the display, and change a color of the clock area according to a type of a notification when the notification is received through the wireless communication unit.

According to another aspect of the present invention, there is provided a method for controlling the mobile terminal wearable on a user's body and including a display is formed on one side, a length of the first direction of the display being longer than a length of the second direction of the display including: displaying a clock area at a center of the display; causing to the display to move the clock area to an edge of the display corresponding to a first drag input when the first drag input is received on the clock area; and displaying an notification icon at the center.

According to another aspect of the present invention, there is provided a method for controlling the mobile terminal wearable on a user's body and including a display is formed on one side, a length of the first direction of the display being longer than a length of the second direction of the display including: displaying, via the display, a clock area at a center of the display; and changing a color of the clock area according to a type of a notification when the notification is received.

Advantageous Effects

The mobile terminal and the method for controlling the same according to the present invention have the following advantages.

According to at least one embodiment of the present invention, it is possible to display directly notification contents at a center of a display through an interaction of relatively long direction of the display.

According to at least one embodiment of the present invention, it is possible to identify visually types of notification and display dynamically the notifications based on user interaction.

The above and other aspects of the present invention will be described in detail through preferred embodiments with reference to the accompanying drawings so that the present invention may be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims.

DESCRIPTION OF DRAWINGS

FIG. 1 illustrates a mobile terminal according to some embodiments of the present invention.

FIGS. 2A and 2B are conceptual views of one example of the mobile terminal, viewed from different directions.

FIGS. 3 to 5 are flowcharts illustrating a method for controlling the mobile terminal according to the first embodiment of the present invention.

FIGS. 6 to 8 illustrate a method for controlling the mobile terminal according to the first embodiment of the present invention.

FIGS. 9 to 12 are flowcharts illustrating a method for controlling the mobile terminal according to the second embodiment of the present invention.

FIGS. 13 to 16 illustrate a method for controlling the mobile terminal according to the second embodiment of the present invention.

FIGS. 17 to 23 illustrate a method for controlling the mobile terminal according to the third embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger smay sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, a haptic module 153, and an optical output module 154. The display 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with each other to implement operation, control or control method of a mobile terminal according to various embodiments described below. In addition, the operation, control or control method of the mobile terminal may be implemented on the mobile terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. Optionally, the location information module 115 may perform any of the other functions of the wireless communication unit 110 to obtain data regarding the location of the mobile terminal. The location information module 115 is a module used to obtain the location (or current location) of the mobile terminal, and is not limited to a module that directly calculates or obtains the location of the mobile terminal.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to smay movement of the physical object in proximity to the touch screen. In more detail, the photo sensor may include photo diodes and transistors at rows and columns to smay content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

In some embodiments, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device may exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

FIGS. 2A and 2B are perspective views illustrating one example of a mobile terminal 300 related to the present invention.

As illustrated in FIGS. 2A and 2B, the mobile terminal 300 may be formed in a watch type or a bangle type, and includes a main body 301 with a display 351 and a band 302 connected to the main body 301 to be wearable on a wrist. In general, mobile terminal 300 may be configured to include features that are the same or similar to that of mobile terminal 100 of FIG. 1.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 may perform wireless communication, and an antenna for the wireless communication may be installed in the main body 301. The antenna may extend its function using the case. For example, a case including a conductive material may be electrically connected to the antenna to extend a ground area or a radiation area.

The display 351 is shown located at the front side of the main body 301 so that displayed information is viewable to a user. In some embodiments, the display 351 includes a touch sensor so that the display may function as a touch screen. As illustrated, window 351a is positioned on the first case 301a to form a front surface of the terminal body together with the first case 301a.

The display 351 may be configured as a flexible display that is deformable by an external force. This deformation may include any of curving, bending, folding, twisting, rolling, and combinations thereof. In some implementations, the flexible display may include a general flexible display, electronic paper (also known as e-paper), and combinations thereof.

The flexible display of mobile terminal 200 is generally formed as a lightweight, non-fragile display, which still exhibits characteristics of a conventional flat panel display, but is instead fabricated on a flexible substrate which may be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display is not deformed (for example, in a state with an infinite radius of curvature and referred to as a first state), a display area of the flexible display includes a generally flat surface. When in a state that the flexible display is deformed from the first state by an external force (for example, a state with a finite radius of curvature and referred to as a second state), the display area may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display may be a curved state (for example, a state of being curved from up to down or from right to left), instead of being in flat state. In this embodiment, when an external force is applied to the flexible display, the flexible display may transition to the second state such that the flexible display is deformed into the flat state (or a less curved state) or into a more curved state.

If desired, the flexible display may implement a flexible touch screen using a touch sensor in combination with the display. When a touch is received at the flexible touch screen, the controller 180 may execute certain control corresponding to the touch input. In general, the flexible touch screen is configured to sense touch and other input while in both the first and second states.

One option is to configure the mobile terminal to include a deformation sensor which senses the deforming of the flexible display. The deformation sensor may be included in the sensing unit.

The deformation sensor may be located in the flexible display 251 or the case 201 to sense information related to the deforming of the flexible display 251. Examples of such information related to the deforming of the flexible display 251 may be a deformed direction, a deformed degree, a deformed position, a deformed amount of time, an acceleration that the deformed flexible display 251 is restored, and the like. Other possibilities include most any type of information which may be sensed in response to the curving of the flexible display or sensed while the flexible display 251 is transitioning into, or existing in, the first and second states.

In some embodiments, controller or other component may change information displayed on the flexible display, or generate a control signal for controlling a function of the mobile terminal, based on the information related to the deforming of the flexible display. Such information is typically sensed by the deformation sensor.

The mobile terminal is shown having a case for accommodating the flexible display. The case may be deformable together with the flexible display, taking into account the characteristics of the flexible display.

A battery (not shown in this figure) located in the mobile terminal may also be deformable in cooperation with the flexible display, taking into account the characteristic of the flexible display. One technique to implement such a battery is to use a stack and folding method of stacking battery cells.

The deformation of the flexible display not limited to perform by an external force. For example, the flexible display may be deformed into the second state from the first state by a user command, application command, or the like.

The illustrated embodiment includes audio output module 352, a camera 321, a microphone 322, and a user input unit 323 positioned on the main body 301. When the display 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference. One side of the band 302 of the bangle type is formed in a round shape so as to surround the user's body and an insertion opening 301a is formed on the other side of the band so that the display may be inserted.

In one configuration, the band 302 may be used for extending the performance of the antenna. For example, the band may include therein a ground extending portion (not shown) electrically connected to the antenna to extend a ground area.

The band 302 may include fastener 302a, 302b. The fastener 302a, 302b may be implemented into a buckle type, a snap-fit hook structure, a Velcro® type, or the like, and include a flexible section or material. The drawing illustrates an example that the fastener 302a, 302b is implemented using a hook.

Further preferred embodiments will be described in more detail with reference to additional drawing figures. It is understood by those skilled in the art that the present features may be embodied in several forms without departing from the characteristics thereof.

FIGS. 3 to 5 are flowcharts illustrating a method for controlling the mobile terminal according to the first embodiment of the present invention, and FIGS. 6 to 8 illustrate a method for controlling the mobile terminal according to the first embodiment of the present invention.

Referring to FIG. 3, a method of controlling the mobile terminal may display a clock area at a center of the display in S110. Here, the mobile terminal may be formed in a bangle type or a watch type.

The mobile terminal may be wearable on a user's body, and may include the display is formed on one side of the band of the bangle type, a length of a first direction of the display being longer than a length of a second direction of the display.

Specifically, if an event does not occur, the controller may display the clock area at the center of the display and may arrange an interface to use a clock function as a main function.

Next, the controller may receive a first drag input on the clock area in S120, and may move the clock area to an edge of the display corresponding to a first drag input and display a notification icon at the center in S130. Here, the first drag input may be an input in a direction in which a length of a horizontal direction or a vertical direction of the display is relatively long.

Specifically, the controller of the mobile terminal may move the clock area in a first drag direction according to the first drag input, and may display a received notification icon at the center of the display. Here, the center of the display may be defined as a center of a display area except for the clock area or the clock area before the first drag input is received.

In this case, the controller may gradually move the clock area in the first drag direction as the first drag input is received, and then may display the clock area in the area where the first drag input is released when the first drag input is released. Therefore, the controller may display only the clock area and not display the notification icon until the first drag input is received.

When a notification is received, the controller may display an indicator for guiding the first drag input on the display. Also, the controller may display the indicator for a predetermined time and then release a display of the indicator or may control the indicator to blink at a predetermined time period.

The controller may change a color of the clock area corresponding to a type of the notification icon, and may display the changed color. For example, if the type of notification is a message, the controller may change the clock area to yellow, and if the type of notification is a software update message, the controller may change the clock area to red. In addition, the controller may be configured to change the color of the clock area when the notification is received by dividing the notification into various criteria.

Referring to FIG. 4, the controller may display the notification icon at the center of the display, the clock area at an edge of the display, and then may receive a second drag input on the clock area in S140. Here, the second drag input may be a continuous touch input in the opposite direction to the first drag input.

The controller may receive a second drag input starting from a clock area displayed at an edge of the display and dragging to the notification icon displayed in the center of the display. The controller may gradually move the clock area in the second drag direction as the second drag input is received.

When the second drag input is released, the controller may execute an application corresponding to the notification icon, and may display notification contents in S150.

When the second drag input is released in a state where the clock area overlaps with the notification icon according to the second drag input, the controller may execute an application corresponding to the notification icon and display the latest received notification contents.

Referring to FIG. 5, when the notification icon is associated with a plurality of notification contents and the second drag input is received, the controller may display a specific icon indicating a specific notification contents among the plurality of notification contents at the center of the display in S160. Here, the second drag input has an opposite direction to the first drag input, and represents an input from one edge of the display to other edge of the display. The controller may move the clock area from the one edge of the display to the other edge of the display as the second drag input is received.

Next, when a third drag input is received in the clock area in S170, the controller may execute an application corresponding to the specific icon and may display the specific notification contents in S180. Here, the third drag input represents an input from the other edge of the display to the center of the display in which a specific icon is displayed.

The controller may display a notification icon set according to whether the direction of the first drag input is the upward direction or the downward direction. More specifically, the controller may display a message notification icon when the first drag input is upward, and may display an update notification icon when the first drag input is downward. If the notification does not exist, the controller may not display an icon at the center of the display even if the first drag input is received.

Referring to FIG. 6, the controller of the mobile terminal may display the clock area R1 at the center of the display 351 whose length l1 in the first direction is longer than the length l2 in the second direction.

The length l1 in the first direction of the display 351 may be formed to correspond to the average length of the flat surface of the wrist of person, and the length l2 in the second direction may be less than 50% of the length l1 in the first direction. The display 351 may include a bezel area 351a and a display area 351b, and the clock area R1 may be displayed at the center of the display area 351b.

When the first drag input Id starting from the clock area R1 is received, the controller may move the clock area R1 according to the first drag input, and may display the notification icon In at the center of the display. Here, the center of the display may be defined as the center of the display area except for the clock area or the clock area before the first drag input is received.

When the notification is received, the controller may display on the display 351 an indicator (Id) for guiding the first drag input.

Referring to FIG. 7, when the second drag input is received in a state where the clock area R1 is displayed at the edge of the display and the notification icon In is displayed at the center of the display, the controller may execute an application corresponding to the notification icon, and may display notification contents in the display area 351b of the display 351.

As shown, the notification icon may be a message icon indicating receipt of a new message.

The second drag input represents an input in upward direction of the display, which is opposite to the first drag input. The controller may move the clock area R1 to the upper edge of the display according to the second drag input.

When the second drag input is received up to the area where the notification icon In is displayed, the controller may display the notification icon In and the clock area R1 in an overlapping manner. When the second drag input is released in a state where the notification icon In and the clock area R1 are overlapped, the controller may execute a message application corresponding to the message notification icon In and may display the received message contents in the display area 351b.

When the message application is executed and the contents of the message are displayed, the controller may change the boundary between the display area 351b and the bezel area 351a (FIG. 7(d)). The controller may display the name of the sender (AAA) of the message, the telephone number (010-XXX-XXXX), the stored image, and the message contents (Blah~) in the display area 351b.

Referring to FIG. 8, the controller may display the clock area R1 on the lower edge of the display in accordance with the first drag input directed to the lower direction of the display, and may receive the second drag input in a state where display the missed call notification icon In at the center.

The controller may move the clock area R1 from the lower edge of the display to the upper edge in accordance with the second drag input, and may display the missed call notification icon In and the clock area R1 in an overlapping manner when the second drag input is continuously received.

The controller may display a specific icon P1 indicating the other party of the missed call on the lower edge of the display when the clock area R1 starts overlapping with the missed call notification icon In as the second drag input is received. The specific icon P1 may be identification information of the other party such as the name, image, and telephone number of the missed call.

When the second drag input is released in a state where the specific icon P1 is displayed, the controller may perform a call to a mobile terminal of the other party corresponding to the specific icon P1, and may display an execution screen of the call. At this time, the controller may display the name and phone number of the other party in the call, and may display the function that can be changed during the call in the display area 351b with an icon.

FIGS. 9 to 12 are flowcharts illustrating a method for controlling the mobile terminal according to the second embodiment of the present invention, and FIGS. 13 to 16 illustrate a method for controlling the mobile terminal according to the second embodiment of the present invention. Here, the mobile terminal may be formed as a bangle type or a watch type.

Referring to FIG. 9, the control method of the mobile terminal may display a clock area at the center of the display in S210.

The mobile terminal may be formed as a bangle type including the display having a length longer in a first direction than a length in a second direction on one side of the band, the band may be wearable on a user's body and may be a bangle type, and the display may be divided into a bezel area and a display area.

Specifically, the controller may display the clock area at the center of the display area of the display.

Next, when the notification is received in S220, the controller may change the color of the clock area according to the type of the notification in S230.

Specifically, the controller may display the clock area of the display area of the display in a color different from the other area of the display area. In addition, the controller may determine the color of the clock area according to the type of the received notification. For example, when a message notification is received, the controller may change the clock area to yellow, and when a missed call notification is received, the controller may change the clock area to green, and when a software update notification is received, the controller may change the clock area to red.

When the received notification is of a plurality of kinds, the controller may periodically switch the color of the clock area to a color corresponding to the plurality of types of notifications. Specifically, when a missed call notification and a message notification are received, the controller may switch the color of the clock area to yellow and green.

Referring to FIG. 10, when a touch input is received on the clock area in S240, the controller may display an icon indicating the type of the notification at the edge of the display in S250.

The controller may display icons of different numbers according to the type of the received notification, and may determine a display position of the icon according to the reception time of the notification, the type of notification, the number of notifications, and the like.

Referring to FIG. 11, when a drag input is received on the clock area in a clockwise direction or a counterclockwise direction in step S260, the controller may display the notification contents by adjusting the transparency of the clock area in S270.

Specifically, the controller may gradually adjust the transparency of the clock area according to the length or the reception time of the drag input of the clockwise or counterclockwise direction. As the transparency of the clock area is adjusted, the controller may gradually display the time displayed in the clock area in a transparent manner, and may overlap with the notification contents. The controller may display only the notification contents without displaying the time when the drag input is received longer than the threshold value.

When the drag input of the clockwise or counterclockwise direction is released, the controller may control the display to release the display of the notification contents displayed in the clock area, and may display only the time again. In addition, when the notification contents are displayed by adjusting the transparency of the clock area in accordance with the drag input of the clockwise direction, the controller may receive the input of the counterclockwise direction and recover the display of the clock area to the previous state.

Referring to FIG. 12, when a drag input of the first direction is received on the clock area in S280, the controller may display a clock area at the edge of the display according to the drag input of the first direction, and may display notification contents at the center of the display in S290.

The user may recognize the reception of the notification when the color of the clock area is changed, and may confirm the notification contents through the first drag input on the clock area.

The controller may gradually display detailed information of the notification contents according to the length of the drag input of the first direction. That is, when the length of the drag input of the first direction is less than the threshold value, the controller may display only the thumbnail information of the notification contents, and when the length of the drag input of the first direction is equal to or larger than the threshold value, the controller may display detailed information of the notification contents.

Referring to FIG. 13, when a notification is received through the wireless communication unit, the controller of the mobile terminal may change the color of the clock area according to the type of the notification.

The controller may preset the color of the clock area corresponding to the type of the notification, and may display the clock area as the stored default color when there is no received notification. In addition, the controller may periodically switch the color of the clock area when a plurality of kinds of notifications is received. At this time, the controller may adjust the switching period according to the number of notifications of the same kind. For example, if there are 5 message notifications and 2 missed call notifications, the controller may respectively switch the color of the clock area to 5 seconds to yellow corresponding to the message notifications and 2 seconds to green corresponding to the missed call notifications.

As shown, the controller may display the clock area in different colors (shown with different hatching) for missed call notification, message notification, and application push notification.

Referring to FIG. 14, when a touch input is received on the clock area R1 whose color has been changed, the controller may display the at least one notification icons In1, In2 at the edge of the display which is a peripheral area of the clock area R1. Here, the edge of the display may be defined as an area excluding the clock area R1 from the display area 351b of the display.

When a touch input on the clock area is received, the controller may display notification icons corresponding to the received notifications in the edge of the display. At this time, the controller may set the position of each notification icon according to the number or type of notifications, and the like. For example, the controller may display a notification icon for a large number of notifications at the upper portion, and may display a notification icon for a relatively small number of notifications at the lower portion. In addition, when there are two or more types of notifications, the controller may arrange the notification icons in the clockwise or counterclockwise direction at regular intervals.

Referring to FIG. 15, when a drag input is received in clockwise or counterclockwise direction on the clock area R1 whose color is changed, the controller may display the notification contents by adjusting the transparency of the clock area R1.

Specifically, when a drag input of the clockwise direction is received on the clock area R1, the controller may adjust the transparency of the time T displayed on the clock area R1 to overlap with the notification contents M (FIG. 15(b)).

When the drag input is continuously received in the clockwise direction, the controller may release the display of the time T, and may display only the notification contents M in the clock area R1.

The controller may display the notification contents M in the clock area R1 even when the drag input of the clockwise direction is released, and may recover the display of the clock area to the previous display state when the drag input of the counterclockwise direction is received. Further, when the drag input of the clockwise direction is released, the controller may release the display of the notification contents M, and may display the time again in the clock area R1.

Referring to FIG. 16, when a drag input of the first direction is received on the clock area R1, the controller may move the clock area R1 in the drag direction, and may display notification contents M from the edge of the display in response to the drag input in the first direction.

Specifically, when the drag input of the upper direction is received on the clock area R1, the controller may move the clock area R1 to the upper edge of the display, and may move the notification contents M from the lower edge of the display to the center of the display.

As the drag input of the first direction is continuously received, the controller may move the clock area R1 gradually from the upper edge of the display to the outside of the display, thereby displaying only a part of the clock area R1 on the display.

When the drag input is received in the clockwise or counterclockwise direction, the controller may display the notification contents by adjusting the transparency of the clock area R1.

The controller may display only the brief information or the thumbnail information of the notification contents M when the notification content M is moved from the edge of the display to the center of the display, and may display the brief information or the thumbnail information relatively transparently as compared with the display property of the clock area R1. The controller may display detailed information of the notification contents M on the entire area of display area 351b of the display when the notification contents M is moved to the center of the display according to the drag input of the first direction. In this case, the controller may adjust the transparency of the notification contents M.

FIGS. 17 to 23 illustrate a method for controlling the mobile terminal according to the third embodiment of the present invention. Here, the mobile terminal may be formed as a bangle type or a watch type.

Referring to FIG. 17, the controller may divide the display 351 into a bezel area 351a and a display area 351b, and may display the clock area R1 at the center of the display area 351b in the initial state. Here, the initial state means a state when the power of the mobile terminal is turned on.

The controller may display the boundary between the bezel area 351a and the display area 351b and the boundary of the clock area R1 with a design of a predetermined type. For example, each boundary may be displayed as a curve (FIG. 17(a)) or a straight line (FIG. 17(b)). It may be set to display in various forms other than the above-described form.

Referring to FIGS. 18 to 21, the controller may recognize the bezel areas 351a of both edges of the display 351 (Hereinafter referred to as a first bezel region and a second bezel region) and the two display areas 351b divided by the clock area R1 (Hereinafter, referred to as a first display area and a second display area) as each of the divided areas.

The controller may display different setting screens on the display 351 depending on whether a drag input is started in any one of the first and second bezel areas 351a and the first and second display areas 351b.

Referring to FIG. 18, when a drag input starting from the first display area 351b is received, the controller may display a simple setting item of the terminal on the display 351.

Specifically, the drag input starting from the first display area is received, the controller may display icons capable of setting volume on/off, illumination on/off, bluetooth on/off, WiFi on/off, position information module on/off, airplane mode on/off, etc. in the display area 351b of the display. When a touch input is received for each icon, the controller may change the setting corresponding to each icon to on or off.

Referring to FIG. 19, when a drag input starting from the first bezel area 351a is received, the controller may change the setting so that the terminal functions only as a clock, and may display the changed contents of the clock mode setting on the display 351.

Specifically, when the drag input starting from the first bezel area 351a is received, the controller may display the changed contents of the clock mode setting in the display area 351b of the display, that is, "Keep Calm and Enjoy The Silence".

Referring to FIG. 20, when a drag input starting from the second display area 351b is received, the controller may display a received message item or a received notification item in the display area 351b of the display.

Specifically, when the drag input starting from the second display area 351b is received, the controller may display a received event, for example, a received message, a missed call, a software update notification, and the like on the display. The controller may display each event by equalizing the display area 351b of the display according to the number of received events. At this time, only thumbnail information or simple information of each event may be displayed.

Referring to FIG. 21, when a drag input starting from the second bezel area 351a is received, the controller may display a preset shortcut icon on the display 351.

When the drag input starting from the second bezel area is received, the controller may set a shortcut icon selected by the user or a predetermined number of shortcut icons with a high usage count to be displayed on the display.

Referring to 22, the controller may display specific icons Ib, Iv in the bezel area 351a, and may display a control bar for controlling the function corresponding to the specific icon on the display when a touch input to the specific icons Ib and Iv is received.

Specifically, the controller may display specific icons Ib and Iv for adjusting the brightness and volume of the display on the bezel area 351a, and may display a control bar for controlling each function when a touch input to the specific icon is received. The controller may adjust the brightness or the volume according to the drag input to the control bar, and may change the brightness or the volume to the level unit set according to the length of the drag input.

Referring to FIG. 23, when the received event is displayed on the display 351, the controller may scroll the displayed event notification contents upon receipt of the drag input. At this time, the controller may adjust the number of events displayed on the display according to the drag speed.

Specifically, the controller may display the received event notification contents on the display, may display three notification contents on the display when the drag input of the speed d1 is received in state where the notification contents is displayed, and may display six notification contents on the display when the drag input of the speed d2.

According to the present invention, it is possible to provide a user interface for displaying notification and notification contents to be suitable for the mobile terminal including a display whose one direction is longer than the other direction.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
a band formed as a bangle and wearable on a user's body;
a display formed on one side of the bangle, an opposite side of the one side contacting the user's body; and
a controller configured to:
  display, via the display, a clock area at a center of the display such that the clock area is displayed between two display areas of the display, the clock area showing current time;
  cause the display to move the clock area from the center to an edge of the display corresponding to a first drag input when the first drag input is received, wherein the first drag input is initiated from the clock area and comprises dragging the clock area from the center toward the edge of the display, passing one of the two display areas, and wherein an entire area of the clock area displayed at the center is displayed when the clock area is moved to the edge of the display;
  display, via the display, a notification icon at the center when the clock area is at the edge of the display in response to the first drag input; and
  cause the display to adjust a transparency of the clock area and display notification contents on the clock area in response to a second drag input received on the clock area in a clockwise or counterclockwise direction such that both the current time and the notification contents are displayed overlappingly on the clock area and then only the notification contents are displayed on the clock area when the second drag input is received continuously,
wherein the current time is re-displayed on the clock area when the second drag input is released from the display or when a third drag input is received on the clock area, a direction of the third drag input being opposite of the clockwise or counterclockwise direction of the second drag input.

2. The mobile terminal according to claim 1, wherein:
a length of a first direction of the display is longer than a length of a second direction of the display;
the clock area is dragged along the first direction in response to the first drag input; and
the notification icon is displayed above or below the clock area showing the current time.

3. The mobile terminal according to claim 1, wherein the controller is further configured to change a clock mode setting in response to a drag input initiated from a bezel area of the display such that the mobile terminal functions only as a clock according to the changed clock mode setting, the drag input initiated from the bezel area terminated at the clock area.

4. The mobile terminal according to claim 1, wherein when a notification is received, the controller is further configured to cause the display to display an indicator for guiding the first drag input such that the first drag input is received in response to the indicator.

5. The mobile terminal according to claim 1, wherein when a fourth drag input is received in an opposite direction of a direction of the first drag input on the clock area, the controller is further configured to execute an application corresponding to the notification icon, and cause the display to display notification contents corresponding to the notification icon such that the notification icon and the clock area are no longer displayed when the notification contents are displayed.

6. The mobile terminal according to claim 5, wherein the controller is further configured to:
cause the display to display a specific icon indicating a specific notification contents among the plurality of notification contents at the center when the notification icon indicates a plurality of notification contents and the fourth drag input is received;
execute an application corresponding to the specific icon when a fifth drag input is received on the clock area; and
cause the display to display the specific notification contents.

7. The mobile terminal according to claim 5, wherein the fourth drag input is initiated from the clock area displayed at the edge of the display and comprises dragging the clock area toward the notification icon such that the notification icon and the clock area are displayed overlappingly.

8. The mobile terminal according to claim 1, wherein one side of the band is formed in a round shape so as to surround the user's body and an insertion opening is formed on another side of the band so that the display is insertable to the insertion opening.

9. The mobile terminal according to claim 1, wherein the transparency of the clock area is adjusted stepwise according to a duration of the second drag input such that the current time is no longer displayed on the clock area when the second drag input is completed.

10. The mobile terminal according to claim 1, wherein the notification icon is not displayed prior to receiving the first drag input while the clock area is displayed at the center of the display, and wherein the notification icon is not displayed until the first drag input is released from the display.

11. A mobile terminal comprising:
a band formed as a bangle and wearable on a user's body;
a wireless communication unit;
a display formed on one side of the bangle, an opposite side of the one side contacting the user's body; and
a controller configured to:
display, via the display, a clock area at a center of the display such that the clock area is displayed between two display areas of the display, the clock area showing current time;
change a color of the clock area according to a type of a notification when the notification is received through the wireless communication unit;
cause the display to adjust a transparency of the clock area and display notification contents in response to a first drag input received on the clock area in a clockwise or counterclockwise direction such that both the current time and the notification contents are displayed overlappingly on the clock area and then only the notification contents are displayed on the clock area when the first drag input is received continuously,
wherein the current time is re-displayed on the clock area when the first drag input is released from the display or when a second drag input is received on the clock area, a direction of the second drag input being opposite of the clockwise or counterclockwise direction of the first drag input;
divide the display into the clock area, an edge area surrounding the clock area, and a bezel area surrounding the edge area;
execute a menu corresponding to a specific area when a third drag input is received in a first direction starting from the specific area among the divided areas; and
adjust a size of a display area of each notification according to a speed of the third drag input received while a plurality of notifications are displayed on the display such that a number of notifications displayed on the display increases as the speed of the third drag input increases.

12. The mobile terminal according to claim 11, wherein when a plurality of types of notifications are received, the controller switches the color of the clock area to a color corresponding to a respective one of the plurality of types of notifications such that the color of the clock area is changed periodically according to a set period and a number of the plurality of types of notifications such that the clock area is displayed in a first color for a first period set according to a number of first type of notifications and then displayed in a second color for a second period according to a number of second type of notifications,
wherein the first period is equal to the second period when the number of the first type of notifications and the number of the second type of notifications are same, and
wherein the first period is greater or less than the second period when the number of the first type of notifications and the number of the second type of notifications are different.

13. The mobile terminal according to claim 11, wherein when a touch input is received on the clock area, the controller displays at least one icon indicating the type of the notification on an edge of the display, the type of the notification comprising at least a missed call notification, a message notification, or an application push notification.

14. The mobile terminal according to claim 11, wherein the controller is further configured to cause the display to:
move the clock area to an edge of the display in accordance with a fourth drag input received in the first direction on the clock area; and
display notification contents at the center of the display when the clock area is moved from the center to the edge of the display.

15. The mobile terminal according to claim 14, wherein the controller is further configured to cause the display to display detailed information of the notification contents in response to the fourth drag input in the first direction such that an amount of the displayed detailed information increases as a length of the fourth drag input in the first direction increases.

16. The mobile terminal according to claim 11, wherein the controller is further configured to cause the display to display at least one first type of notification on the edge area in response to a touch input received on the clock area displayed in a first color.

17. The mobile terminal according to claim 16, wherein the controller displays a brightness setting icon and a volume setting icon on the bezel area, and displays a bar for adjusting a brightness or volume level on the display when a touch input for the brightness setting icon or the volume setting icon is received.

18. The mobile terminal according to claim 16, wherein is further configured to cause the display to display at least one second type of notification on the edge area in response to a touch input received on the clock area displayed in a second color.

19. The mobile terminal according to claim 11, wherein the band and the display are formed of a flexible material and are deformed depending on whether the band is worn or not.

20. A method of controlling a mobile terminal comprising a band formed as a bangle and wearable on a user's body and a display formed on one side of the bangle, an opposite side of the one side contacting the user's body, a length of a first direction of the display being longer than a length of a second direction of the display, the method comprising:

displaying, via the display, a clock area at a center of the display such that the clock area is displayed between two display areas of the display, the clock area showing current time;

changing a color of the clock area according to a type of a notification when the notification is received;

adjusting a transparency of the clock area and displaying notification contents in response to a first drag input received on the clock area in a clockwise or counterclockwise direction such that both the current time and the notification contents are displayed overlappingly on the clock area and then only the notification contents are displayed on the clock area when the first drag input is received continuously, wherein the current time is re-displayed on the clock area when the first drag input is released from the display or when a second drag input is received on the clock area, a direction of the second drag input being opposite of the clockwise or counterclockwise direction of the first drag input;

dividing the display into the clock area, an edge area surrounding the clock area, and a bezel area surrounding the edge area;

executing a menu corresponding to a specific area when a third drag input is received in a first direction starting from the specific area among the divided areas; and adjusting a size of a display area of each notification according to a speed of the third drag input received while a plurality of notifications are displayed on the display such that a number of notifications displayed on the display increases as the speed of the third drag input increases.

* * * * *